Feb. 8, 1927.  
R. K. HAVIGHORST  
1,616,693  
STRUCTURE FOR FACILITATING SORTING AND DELIVERING OF PACKAGES  
Filed March 24, 1925
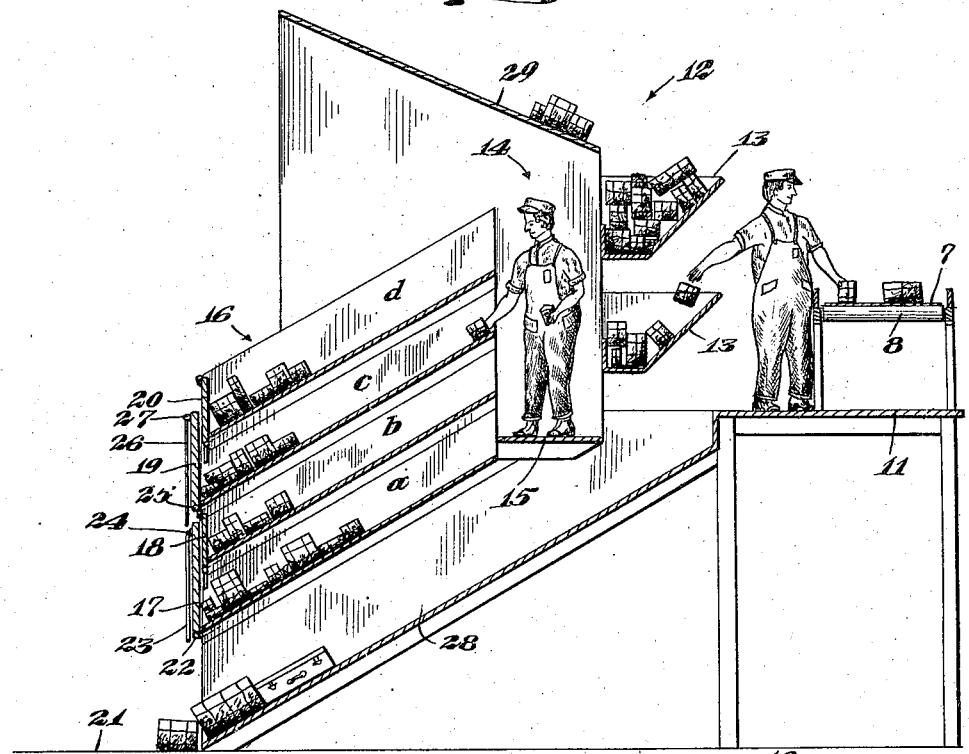
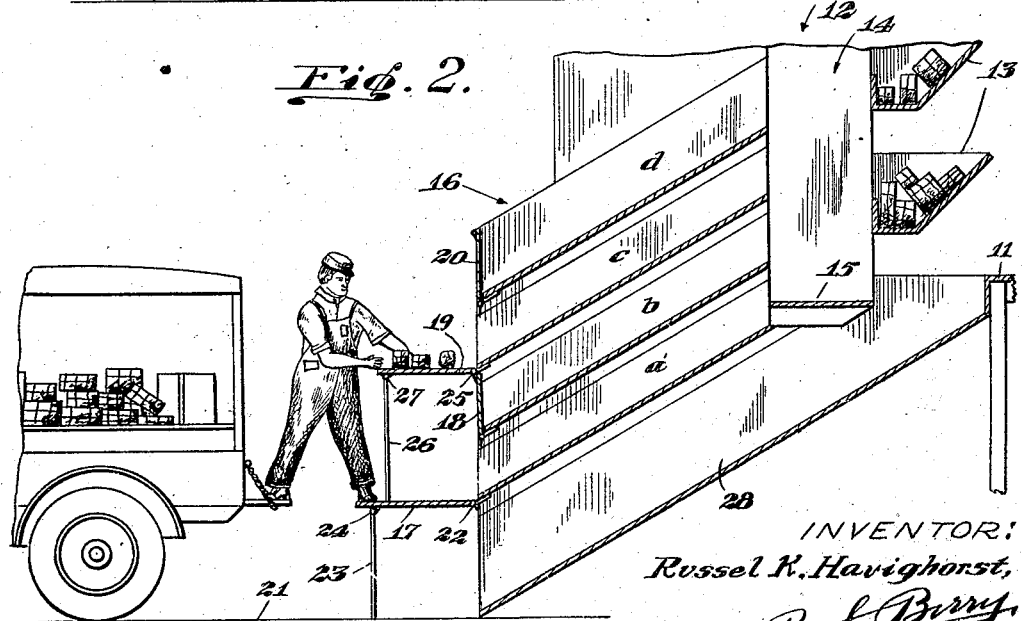
INVENTOR:  
Russel K. Havighorst,  
By R. S. Berry,  
ATTORNEY.

Patented Feb. 8, 1927.

1,616,693

UNITED STATES PATENT OFFICE.

RUSSEL K. HAVIGHORST, OF LOS ANGELES, CALIFORNIA.

STRUCTURE FOR FACILITATING SORTING AND DELIVERING OF PACKAGES.

Application filed March 24, 1925. Serial No. 17,910.

This invention particularly pertains to a structure for facilitating sorting and handling of packages in making parcel deliveries, and especially relates to a structure whereby variously addressed packages may be manually sorted and classified according to their places of delivery.

An object of the invention is to provide a structure of the above character which is especially adapted for use by concerns having occasion to deliver a great number of packages within a short period of time throughout a large area, as for example, in the delivering of merchandise in large cities by department stores, parcel delivery organizations, and the like; and a particular object of the invention is to provide a means whereby considerable time, labor and expense may be saved in effecting the sorting, distributing and delivering of numerous variously addressed packages.

A further object is to provide a means whereby a large quantity of packages to be delivered throughout a city may be readily sorted in readiness to be placed aboard delivery trucks having certain delivery routes; and whereby the parcels to be loaded on a particular truck to be delivered in a certain district may be readily sub-classified so that they may be packed in the truck in the reverse order of their unloading, and arranged so that they may be unloaded in the order of their delivery throughout the route of the truck.

The mode of carrying out the foregoing objects, as well as such objects, features and advantages of the invention as may subsequently appear is hereinafter described and is illustrated by way of example in the accompanying drawings in which the several views depict constructions and arrangements of elements and parts whereby the invention may be carried into effect.

Referring to the drawings the several views are as follows:—

Figure 1 is a view in transverse vertical section illustrating the manner of manually effecting segregation of the packages into general classes and sub-classes;

Figure 2 is a view depicting the manner in which the sub-divided packages may be conveniently loaded on a truck in readiness for delivery.

In order that the invention may be readily comprehended, and a clear understanding be had of the purposes of the various parts and features of the structure herein illustrated and described, it is pointed out that it is customary in parcel delivery systems to theoretically divide an area, such as a city, throughout which the parcels are to be delivered, into a series of general districts, and to map out a route or routes of travel in each district for the delivery vehicle; the packages to be delivered being addressed to indicate their destination and then distributed among the several carriers according to the routes in which the packages are to be delivered. With this practice in view the present invention contemplates the provision of a means whereby a large collection of variously addressed packages accumulated preparatory to delivery may be readily segregated into a series of main and general classifications or groups according to certain districts or routes in which the packages are to be delivered, and thereafter dividing the general classes into a series of sub-classes; and in providing a means whereby the packages in the sub-classes may be accumulated in such manner that they may be easily loaded on trucks in the reverse order of their delivery in certain routes, as will now be fully described.

Referring to the drawings, 7 indicates an endless conveyor to which an aggregation of variously addressed packages are delivered for preliminary marking; one or more attendants at this conveyor placing on the packages suitable code numbers or other indicia designating certain districts in which the packages are to be delivered. The conveyor belt is designed to be maintained in motion during operation for which purpose it may be driven by any suitable mechanism and from any suitable source of power.

Extending along the upper lead of the conveyor belt on a plane therebeneath is a raised platform 11 on which one or more attendants may stand whose functions are to remove the marked packages from the conveyor belt as will presently be described.

Erected to one side of the platform 11 is a structure indicated generally at 12 embodying numerous bins or receptacles to receive the packages removed from the conveyor belt; there being a series of bins 13 arranged in horizontally extending rows adjacent the platform 11 convenient to the reach of the attendants and into which certain of the packages removed from the conveyor belt are to be placed. The structure 12 is here shown as provided with two rows of the bins 13 but the number of such rows may be increased or diminished as occasion may require. The bins 13 are marked singly or in groups in accordance with the code markings employed on the packages to indicate the districts in which the packages are to be delivered; there being at least one bin 13 provided for each delivery district into which a certain territory is divided.

A runway or aisle 14 is provided at the rear of the bins 13 the floor of which comprises a platform 15 on which attendants may stand, and leading from the runway opposite the bins 13 is a series of groups of downwardly inclined chutes 16 which are adapted to constitute bins for the reception of packages removed from the bins 13; there being a group of the chutes 16 provided for each of the bins 13 and each chute of the group is marked to designate some portion of a route in the district represented by the bin.

Each group of the chutes 16 includes a plurality of superimposed chutes as indicated at $a$, $b$, $c$, and $d$, as particularly shown in Figures 1 and 2, the lower ends of which chutes are fitted with hinged closure panels 17, 18, 19 and 20, respectively. The lowermost chutes $a$ terminate in spaced relation to a floor 21 and the closure panels 17 thereof are hinged at 22 to swing downwardly into a horizontal position to form a table, as shown in Figure 2; there being legs 23 hinged at 24 on the closure panels 17 adapted to rest on the floor 21 to support the panels in the table forming position. The closure panels 19 on the chutes $c$ are hinged at 25 to swing downwardly and are adapted to be positioned to extend horizontally as shown in Figure 2, to form a table in superimposed relation to the closure panel 17; there being legs 26 hinged at 27 on the panels 19 adapted to seat on the top of the panels 17 when the latter are extended horizontally to maintain the panels 19 in their table forming position. The panels 19 are of less width than the panels 17 so that when these panels are in their horizontal positions the outer margin of the lower panel will project beyond the margin of the upper panel so as to form a ledge on which an operator may stand when removing packages from the upper panel. The closure panels 18 and 20 are hinged at their upper edges to swing outwardly at their lower edges. Suitable catches are provided for holding the several closure panels in their closed positions.

Extending beneath the lower chute $a$ is a large inclined chute 28 the lower end of which terminates adjacent the floor 21 and the upper portion of which extends beneath the platform 15 and opens adjacent the platform 11, which chute is provided for the reception of packages too bulky or heavy to be placed in the chutes 16; there being one of these large chutes 28 provided for each of the delivery districts represented by one or more of the bins 13, or for each tier of the chutes 16.

Arranged above the runway 14 is an inclined shelf 29 the lower margin of which terminates adjacent the bins 13 which shelf affords a place for the reception of overflow packages.

It will now be seen that by the construction and arrangement of the structure 12 as set forth herein, there will be provided a series of bins or groups of bins 13 adjacent the conveyor belt along the horizontally extending upper lead thereof with an accompanying series of downwardly inclined chutes 28 beneath said bins, and with an inclined overflow shelf above said bins; and that there will be provided a series of groups of chutes 16 back of the bins 13 with a group of such chutes associated with a bin or group of bins 13.

In employing the invention, the addressed packages are deposited on the conveyor 7 where an attendant observes the address on a package and marks it with a symbol adopted to designate the particular district in which the package is to be delivered and thereafter the package on the conveyor belt will be carried to an attendant on the platform 11 who occupies a position near a bin or bins 13 bearing the symbol corresponding to that marked on the package, and who on observing the marking on the package, removes it from the belt and places it in one of the bins 13, marked correspondingly to the code mark on the package. In event the package be too heavy or bulky to be placed in a bin 13 it is deposited in the associated chute 28, and in case the bin 13 be full the package is deposited on the inclined shelf 29 thereabove to be later deposited in the bin 13 when the space is provided therein to receive it. In this manner the various packages will be segregated into a number of general classes according to the various districts in which they are to be delivered; the packages thus segregated being accumulated, should occasion require, in the several bins 13 and their related chutes 28 and shelves 29.

The attendant or attendants in the runway 14 remove the packages from the bins 13 containing packages to be delivered in a particular district and on observing the addresses on the packages determines the exact location of the place of delivery in the district, usually by referring to an index of streets and indicating the routes of travel of the delivery vehicle in the district to which the package is generally directed by the code marking thereon. The attendant then deposits the packages in certain of the chutes $a$, $b$, $c$ and $d$, of the group of chutes 16 where the packages are collected, as shown in Figure 1; the closure panels at the ends of the chutes being closed to retain the packages within the chutes. In this manner the general classes of packages deposited in the bins 13 are separated into a series of sub-classes. This sub-dividing of the class of packages may be carried out to any desired extent by providing a suitable number of the chutes a, b, c and d in a group of such chutes.

The packages to be delivered at the beginning of a route are placed in the uppermost chute or chutes d of a group and those that are to be delivered in intermediate portions of a route are spaced in intermediate chutes c and b, while packages that are to be delivered in the end portion of a route are placed in a lower chute a. In loading the packages on a truck for delivery, the truck is backed and positioned adjacent the discharge ends of the chutes. The attendant lowers the closure panel 17 into its table forming position thereby opening the lower chute a so that the packages in this chute will be discharged on to the table from whence they are removed and placed in the forward portion of the truck whereupon the closure panels 18 are opened to permit the packages in the chute b to be delivered to the table 17 from whence they are removed and replaced in order adjacent the stack of packages previously placed on the truck. The table forming closure 19 of the chute c is then swung downwardly into its table forming position so that the packages in this chute will be delivered thereto from whence they are removed and placed in the truck in their order. The closure panel 20 of the upper chute a is then opened to deliver the packages to the upper table panel 19 which packages are then arranged in the rear portion of the truck.

The packages are thus arranged in the truck in the reverse order of their delivery so that the packages to be delivered at the beginning of a route may be conveniently reached and removed without disturbing the packages in the truck to be delivered thereafter.

In order to conveniently reach the packages on the panel 19 the attendant may stand on the ledge formed by the outer margin of the lower panel 17, as shown in Figure 2.

In loading the truck the attendant first removes the packages from the lower chutes 28 and arranges them conveniently on the truck in the reverse order to their delivery in such manner that they will be distributed with the packages loaded from the chutes 16.

I claim:—

1. In a structure of the character described, a group of superimposed inclined chutes, panels for closing the lower ends of said chutes, and means whereby the panel for closing the lowermost chute is adapted to serve as a table on positioning same to open the chute.

2. In a structure of the character described, a group of superimposed inclined chutes, a series of panels for closing the lower ends of said chutes, the panel for closing the lowermost chute being hinged to swing outwardly and downwardly from the end of the chute adapted to extend horizontally to form a table and the panel for closing a superimposed chute being adapted to be extended to form a table in superposed relation to the other table forming panel.

3. In a structure of the character described, a group of superimposed inclined chutes, a plurality of hinged panels at the lower ends of said chutes adapted to be swung outwardly and downwardly into horizontally extending positions to form a plurality of superimposed tables, and means for supporting said panels in their horizontal positions.

RUSSEL K. HAVIGHORST.